United States Patent
Zhang et al.

(10) Patent No.: US 7,568,003 B2
(45) Date of Patent: Jul. 28, 2009

(54) PUBLISHING INTERFACE FOR PUBLISHING CONTENT FROM A CONTENT-AUTHORING APPLICATION TO A CONTENT SERVER

(75) Inventors: Ning Zhang, Redmond, WA (US); Shiu-Kai Lee, Bellevue, WA (US); Arul Murugan Kumaravel, Redmond, WA (US); Rajivk Kumar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 712 days.

(21) Appl. No.: 10/401,490

(22) Filed: Mar. 28, 2003

(65) Prior Publication Data
US 2004/0189703 A1 Sep. 30, 2004

(51) Int. Cl.
*G06F 15/16* (2006.01)
(52) U.S. Cl. ......................... 709/203; 709/201; 709/246
(58) Field of Classification Search ................. 345/762; 709/201, 203, 246
See application file for complete search history.

(56) References Cited

U.S. PATENT DOCUMENTS

| | | | | | |
|---|---|---|---|---|---|
| 5,996,010 | A | * | 11/1999 | Leong et al. | 709/223 |
| 6,122,647 | A | * | 9/2000 | Horowitz et al. | 715/205 |
| 6,725,446 | B1 | * | 4/2004 | Hahn et al. | 717/103 |
| 6,963,908 | B1 | * | 11/2005 | Lynch et al. | 709/220 |
| 7,013,289 | B2 | * | 3/2006 | Horn et al. | 705/26 |
| 7,032,011 | B2 | * | 4/2006 | Woodard et al. | 709/220 |
| 7,284,195 | B2 | * | 10/2007 | Bates et al. | 715/206 |
| 7,418,657 | B2 | * | 8/2008 | Gorelick et al. | 715/234 |
| 2001/0027457 | A1 | * | 10/2001 | Yee | 707/203 |
| 2002/0069223 | A1 | * | 6/2002 | Goodisman et al. | 707/513 |
| 2002/0194195 | A1 | * | 12/2002 | Fenton et al. | 707/104.1 |
| 2003/0126461 | A1 | * | 7/2003 | Barker et al. | 713/200 |
| 2003/0187859 | A1 | * | 10/2003 | Belov | 707/100 |
| 2004/0205659 | A1 | * | 10/2004 | Barry et al. | 715/530 |
| 2005/0021862 | A1 | * | 1/2005 | Schroeder et al. | 709/246 |

* cited by examiner

*Primary Examiner*—John Follansbee
*Assistant Examiner*—Dhairya A Patel
(74) *Attorney, Agent, or Firm*—Woodcock Washburn LLP

(57) ABSTRACT

A publishing interface is provided for a user to publish content to a content management server (CMS). The content is authored on a work station by way of an authoring application operating thereon and includes a main body and at least one linked object. Each linked object is linked to the main body by a local pointer therein. The CMS is for effectuating a web site including the published content. The publishing interface has a client-side component working with the application and a server-side component working with the CMS. The client-side component resolves each local pointer to a linked object in the main body, converts the main body into a pre-determined format as determined by the selected task, and forwards the converted main body and each linked object thereof to the server-side component. The server-side component stores the converted main body and the linked objects in the CMS.

19 Claims, 4 Drawing Sheets

PUBLISHING INTERFACE FOR PUBLISHING CONTENT FROM A CONTENT-AUTHORING APPLICATION TO A CONTENT SERVER

TECHNICAL FIELD

The present invention relates to an interface between a content-authoring application and a content server such that content authored in the application can be published/submitted to and stored at the content server in a form amenable to the content server. More specifically, the present invention relates to such a publishing interface that facilitates conversion of the content to a network-based format such that the published content can be served by the content server over a network such as the Internet.

BACKGROUND OF THE INVENTION

As may be appreciated, a content management server is employed by an enterprise or organization to build, deploy, and maintain a content-rich web site such as that which may be accessible by way of the Internet or another network. Such a content management server streamlines the web publishing process, thereby reducing costly site maintenance and empowering the enterprise or organization to manage its own content. An example of such a content management server is provided by the MICROSOFT Content Management Server application, as developed and marketed by MICROSOFT Corporation of Redmond, Wash., USA.

Thus, a content management server is employed to deploy an Internet, intranet, or extranet web site, and provides tools necessary to build and deploy the core infrastructure of a web site, including site structure, presentation templates, site design, application integration, and security. In addition, once a site has been deployed, managers and content authors can use content management server tools to create, publish, and manage their own content.

Typically, a content management server provides content managers, authors, and the like with tools that enable such personnel to create and publish rich, personalized content directly to a web site. A role-based distributed publishing model is typically employed, where such model incorporates an approval workflow with multiple levels, automatic content scheduling and archiving, and content indexing. Developers can create centrally-managed page templates and publishing processes that ensure consistency across the site, thus ensuring adherence to organizational publishing standards and branding without diminishing the flexibility of the publishing environment.

In the prior art, to author and publish content to a web site by way of a content management server, a content author would employ a web-based authoring tool within an Internet browser, where the web-based authoring tool is a service provided by the content management server. Typically, such content author would design the content with the aid of a template as provided by the web-based authoring tool, and upon authoring the content would publish the content to the content management server with the aid of the web-based authoring tool. Thereafter, the published content at the content management server is approved by an editor, and then placed in an appropriate location in the web site by a moderator.

However, such a web-based authoring tool does not take advantage of the fact that a content author likely has available thereto one or more content-authoring applications of which such content author is much more familiar and comfortable with. That is, the content author likely has a word-processing application available thereto, a presentation application available thereto, a spreadsheet application available thereto, a relational database application available thereto, and/or the like, each of which is very powerful and highly functional, and each of which the content author is thoroughly familiar with. In contrast, the web-based authoring tool is not as familiar to the content author and is likely not as powerful or functional in terms of authoring capabilities as any of the aforementioned content-authoring applications. Nevertheless, the content author has heretofore been limited to using the web-based authoring tool to author content to be published to the content management server.

Moreover, for the content management server to provide such web-based authoring tool to a content author, the content author heretofore had to be in network connectivity with the content management server. That is, the content author could not author the content remotely from the content management server and then connect and publish thereto.

Accordingly, a need exists for a publishing interface between a content-authoring application and a content management server such that a content author can author content to be published to the content management server on the content-authoring application and then publish the authored content to the content management server. Moreover, a need exists for such a publishing interface that does not require the content author to be in network connectivity with the content management server while authoring the content.

SUMMARY OF THE INVENTION

The aforementioned needs are satisfied at least in part by the present invention in which a publishing interface is provided for a user to publish content to a content management server (CMS). The content is authored on a work station by way of an authoring application operating thereon and includes a main body and at least one linked object. Each linked object is linked to the main body by a local pointer therein. The CMS is for effectuating a web site including the published content.

The publishing interface has a client-side component working with the application on the work station and a server-side component working with the CMS. The client-side component establishes a communicative connection with the server-side component, and the client-side component resolves each local pointer to a linked object in the main body, converts the main body into a pre-determined format as determined by the selected task, and forwards the converted main body and each linked object thereof to the server-side component. The server-side component stores the converted main body and the linked objects in the CMS.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
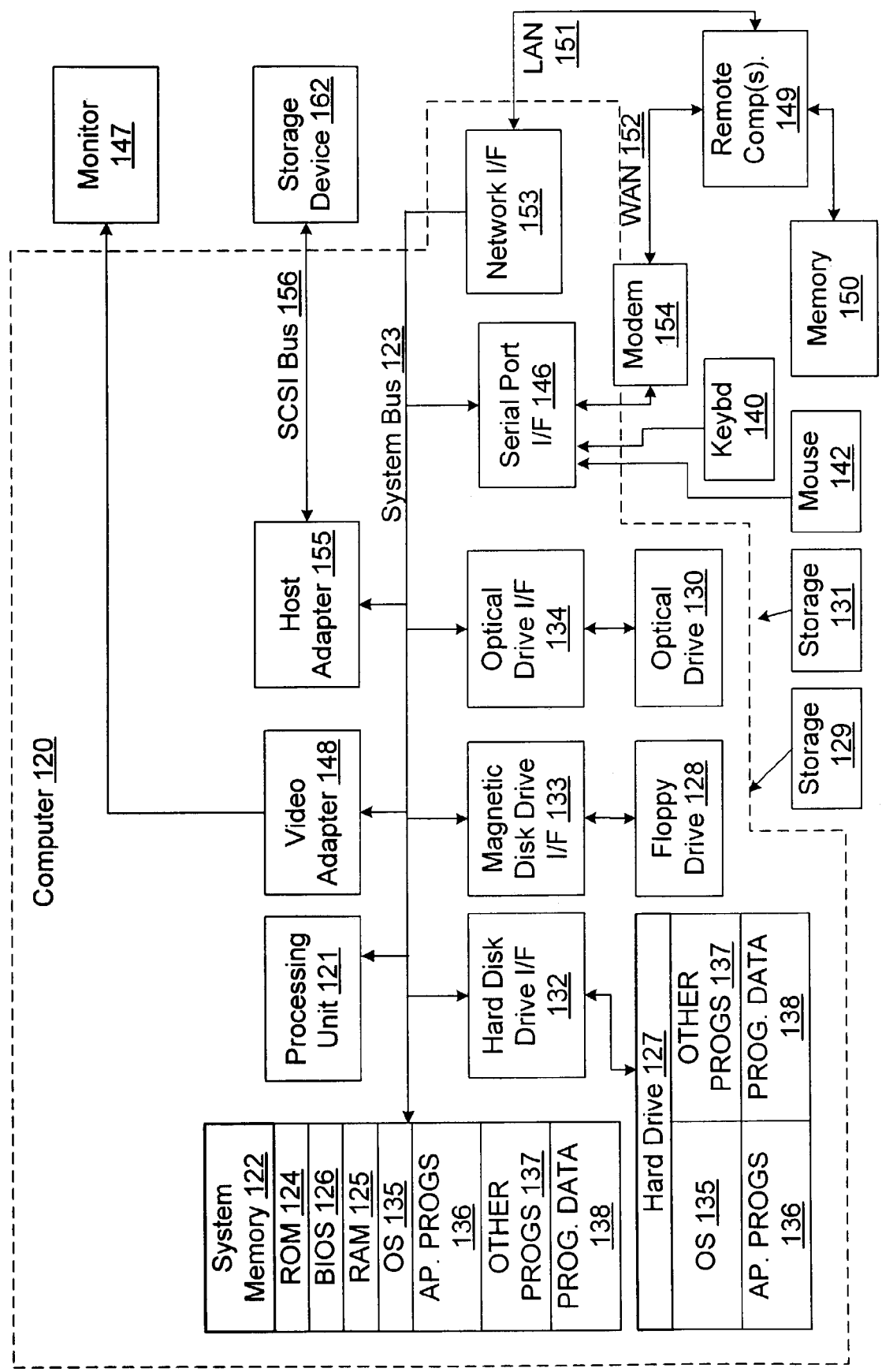
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet. The personal computer 120 may also act as a host to a guest such as another personal computer 120, a more specialized device such as a portable player or portable data assistant, or the like, whereby the host downloads data to and/or uploads data from the guest, among other things.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Publishing Interface

Figure 2:
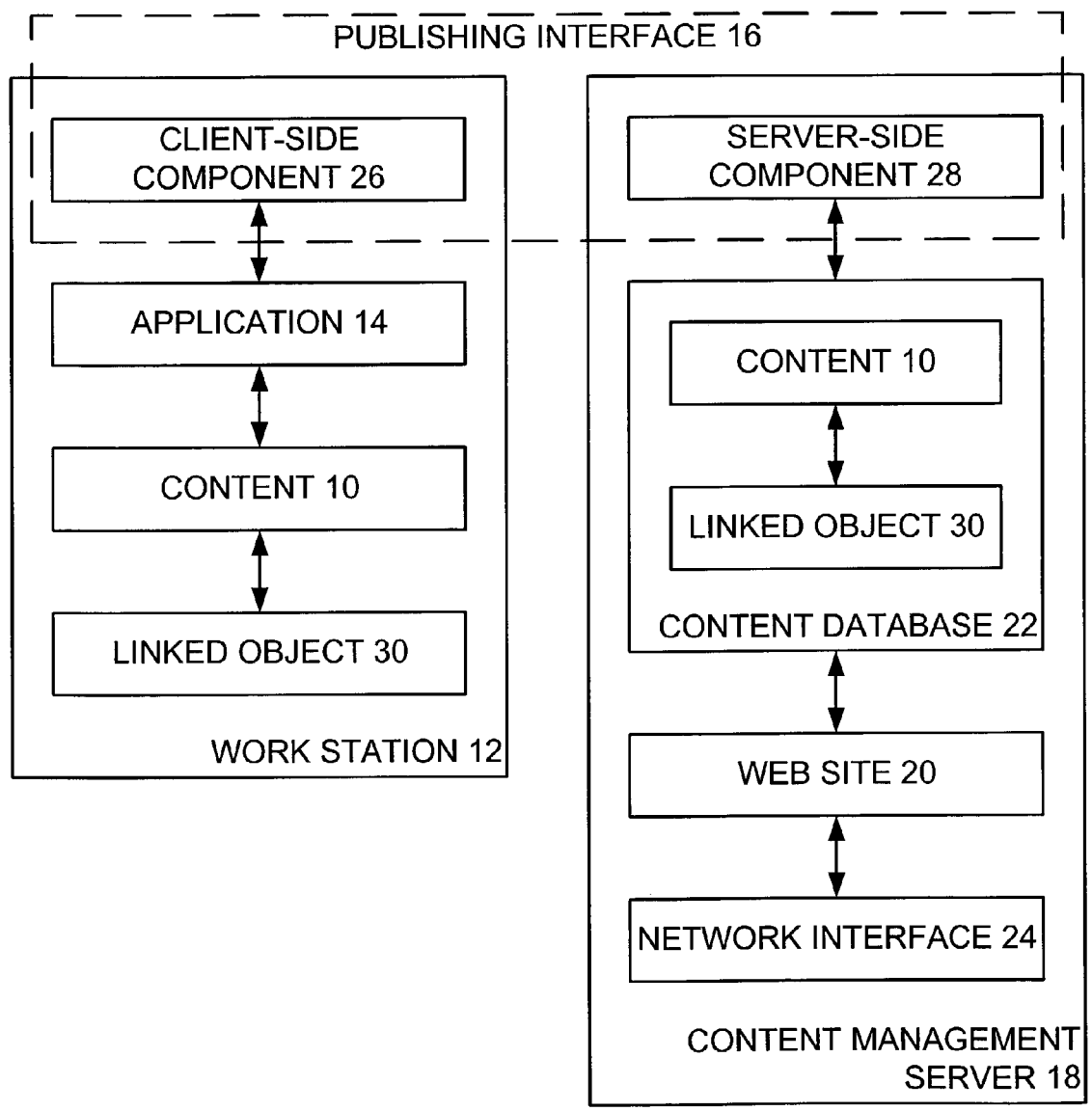
FIG. 2 is block diagram showing a publishing interface interconnecting a work station and a content management server (CMS) in accordance with one embodiment of the present invention.

In one embodiment of the present invention, and referring now to FIG. 2, a content author authors content 10 at a work station 12 by way of an authoring application 14 operating on the work station 12, and a publishing interface 16 is provided to allow the authored content 10 to be published to a content management server (CMS) 18. Note that as used herein, 'publish' includes submitting the authored content 10 to the CMS 18 and all functions ancillary thereto. Such publishing may result in the content 10 being automatically available by way of the CMS 18, or alternatively various approvals and allowances may be required before the content 10 is so available.

The authored content 10 may be any content without departing from the spirit and scope of the present invention, although it is to be understood that such content 10 is being authored for the purpose of being published to the CMS 18 and therefore presumably has some relevance to a web site 20 hosted by the CMS 18. For example, if the web site 20 is an electronic storefront, the authored content 10 may relate to an item available for sale thereat. Likewise, if the web site 20 is a support site, the authored content 10 may be a knowledge base article.

The work station 12 may also be any work station without departing from the spirit and scope of the present invention. For example, the work station 12 may be a desktop or laptop personal computer, or may be a dedicated computer customized for the purpose of authoring content 10. Note that the content 10 may be authored at the work station 12 even if the work station 12 is not connectively coupled to the CMS 18 by a network or the like. In particular, in the present invention, authoring content 10 takes place independent of the CMS 18 and therefore doe not require connectivity to such CMS 18 during such authoring. Of course, such connectivity to the CMS 18 is required to publish authored content 10 thereto.

The authoring application 14 may likewise be any appropriate application without departing from the spirit and scope of the present invention, presuming that such application 14 provides the functionality required by the author of the content 10 to in fact author such content 10. For example, the application 14 may be a word processing application, a spreadsheet application, a presentation application, a relational database application, or the like. Notably, although the web site 20 is likely served by the CMS 18 in a format such as Hyper Text Markup Language (HTML), the application 14 need not produce the content 10 in such HTML format. Instead, in one embodiment of the present invention, the publishing interface 16 converts the authored content 10 into such HTML format as necessary.

The CMS 18 itself may be any appropriate CMS without departing from the spirit and scope of the present invention. Inasmuch as the CMS 18 is known or should be apparent to the relevant public, such CMS 18 need not be described in detail herein except as set forth. Typically, such CMS 18 includes a content database 22 within which is stored content 10 to be served by such CMS 18 in the course of hosting the web site 20, and a network interface 24 by which the CMS 18 receives requests for such content 10 and returns such content 10 in response thereto. As may be appreciated, content 10 within the content database 22 of the CMS 18 is stored with a pre-defined address such as a Universal Resource Locator (URL). Accordingly, such content 10 may be requested based on such URL and located within the content database 22 based on such URL.

Within the content database 22, the authored content 10 is managed separately from web site templates and other design elements. Thus, web pages can be built and served dynamically, enabling content 10 to be personalized based on user profile or behavior, browsing device, language preference, and the like. In addition, by managing content 10 separately, such content 10 can be re-purposed across other applications and web sites 20.

In one embodiment of the present invention, the publishing interface 16 includes a client-side component 26 that works with the application 14 on the work station 12 and a server-side component 28 that works with the CMS 18 in the course of publishing the authored content 10 to the CMS 18. Note that multiple client-side components 26 can publish content 10 to the same CMS 18 and server-side component 28 thereof without departing from the spirit and scope of the present invention.

Thus, and as was alluded to above, the work station 12 with the client-side component 26 of the publishing interface 16 must be communicatively connected to the CMS 18 with the server-side component 28 of the publishing interface 16 to in fact publish content 10 from the application 14 at the work station 12 to the CMS 18. Such connection may be achieved in any appropriate manner without departing from the spirit and scope of the present invention. For example, the connection may be a direct connection or a LAN 151 or WAN 152 such as that shown in FIG. 1.

In one embodiment of the present invention, the client-side component 26 is an add-in or the like for the application 14 that is designed to work with such application 14. Generally, such client-side component 26 includes user interface functions that provide menu items or the like that are to appear in the application 14 and a wizard or the like for allowing the user to input various publishing parameters and other information; communications functions for communicating with the server-side component 28; and conversion functions that convert the authored content 12 from the format of the application 14 (a document format, for example) into the format of the CMS 18 (an HTML format, an XML format, or a binary content object format, for example).

Similarly, in one embodiment of the invention, the server-side component 28 is a service of the CMS 18. Generally, such server-side component 28 includes communications functions for communicating with the client-side component 26; and services functions that work with the CMS 18 to store the authored content 10 in the content database 22. In one embodiment of the present invention, the server-side component 28 provides much of the user interface and logic of the publishing wizard. Thus, such server-side component 28 generates script, such as JavaScript, to interact with the client-side component 26. In such situation, the client-side component 26 may present what is essentially a browser to the user, with user selections within the browser being passed to the server-side component 28 as browser requests.

Figure 3A:
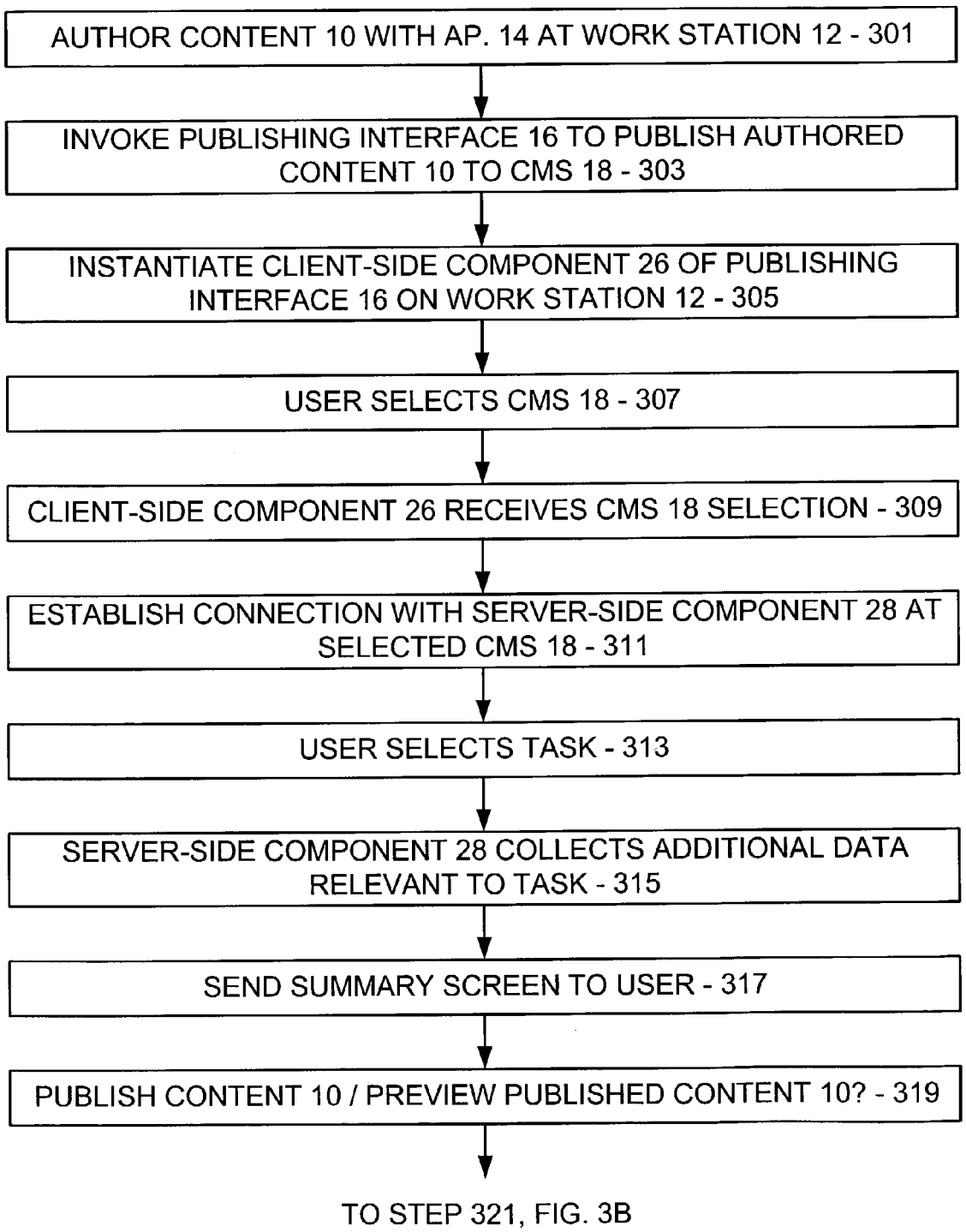
FIGS. 3A and 3B are in combination a flow diagram showing key steps performed in publishing authored content from the work station to the CMS by way of the publishing interface in accordance with one embodiment of the present invention.
Figure 3B:
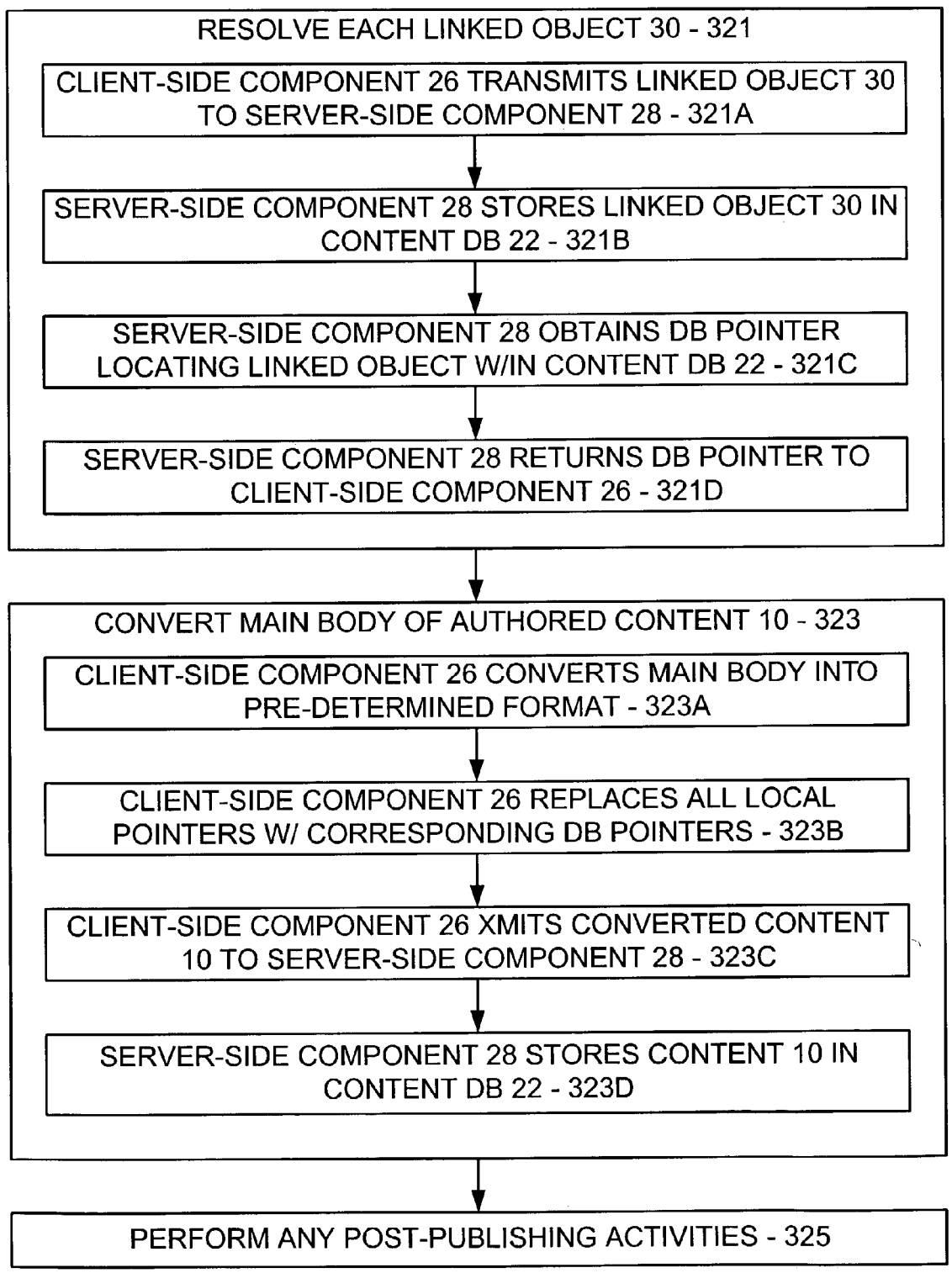

Turning now to FIGS. 3A and 3B, a method performed with the publishing interface 16 is as follows. Preliminarily, the content author in fact authors the content 10 with the application 14 at the work station 12 (step 301). As may be appreciated, such authoring occurs in a format available to the application 14. Note that the application 14 may allow the content 10 to be authored in any of multiple available formats. For example, a word processing application 14 may allow content 10 to be authored in any of several word processing formats native to such application 14, in any of several word processing formats native to another type of word processing application 14, in any of several presentation formats native to one or more presentation applications 14, and the like. In fact, the application 14 may allow content 10 to be authored in the format that the CMS 18 will serve such content 10 on the web site 20, although as will be seen below such content 10 may still require some post-authoring conversion. Note here that in authoring the content 10, the content author and the application 14 do not normally require access to the CMS 18 by way of the publishing interface 16 or otherwise, unless for example the content 10 is to be based on content already stored in the content database 22 or the like.

Once the content 10 has been authored by the content author, such content author or another may then invoke the publishing interface 16 to publish the authored content 10 or a selected portion thereof to the CMS 18 (step 303). In one embodiment of the present invention, upon such invocation, the client-side component 26 of the publishing interface 16 is instantiated on the work station 12 (step 305), and such client-side component 26 performs any introductory functions deemed necessary and/or advisable.

Note that the client-side component 26 may present itself to the user thereof in the form of a wizard or other similar user interface. As such, and as set forth below, the user publishes the authored content 10 to the CMS 18 by way of a series of steps orchestrated by the wizard. As was set forth above, the wizard may be operating under the direction of the server-side component 28 of the publishing interface 16, in which case, the client-side component 26 presents what is essentially a browser to the user, with user selections within the browser being passed to the server-side component 28 as browser requests.

It is to be appreciated that the user may wish to publish the authored content 10 to one of several available CMSs 18, each with a server-side component 28. Accordingly, before the client-side component 26 at the work station 12 can establish a connection with the server-side component 28 at any of the available CMSs 18, the user must select one of such available CMSs 18. As a preliminary matter, then, the client-side component 26 requests that the user select a CMS 18 and receives such a selection (steps 307, 309).

Thereafter, the client-side component 26 at the work station 12 in fact establishes a connection with the server-side component 28 at the selected CMS 18 (step 311). Such establishing may require that the user provide an identification and a password and/or other authentication, or such password and/or authentication may be performed transparently and automatically by the client-side component 26 with appropriate information available thereto and with proper networking support. In the course of establishing the connection, the CMS 18 determines what rights are available to the user. As may be appreciated, based on such rights, the user may be limited as to the actions that the user can perform at the CMS 18, items available to the user at the CMS 18, and the like.

In one embodiment of the present invention the user selects from among a plurality pre-defined tasks that are available to such user (step 313). As may be appreciated, such selected task may be any appropriate task without departing from the spirit and scope of the present invention, and may for example comprise adding the authored content 10 to the web site 20 as a particular kind of content at a particular location, replacing content 10 on the web site 20.with the authored content 10, and/or the like.

In one embodiment of the present invention, each task includes a name and description thereof, an identification of a template which content 10 published based on the task is to follow, and an identification of a channel through which the published content 10 is to be accessible. As may be appreciated, the template may be included with the task or may be a separate file, and specifies the layout and functionality that is to be imparted to the published content 10. For example, the template could describe that the content 10 is to be placed within a frame when served by the CMS 18, and that the frame is to be surrounded by basic links, including a home link, a back link, a help link, an about us link, a contact link, and/or the like. As may also be appreciated, the channel specifies how the content 10 is accessed within the web site 20. Such channel may for example include the URL for the web site 20, a path, and a file name.

Note that as published, the content 10 may be located by navigating through the path to the file name, or by using a local or remote search engine. With regard to the search engine, it may be the case that the content 10 is indexed thereby, or it may be the case that the publishing user has set forth keywords or categories for the content 10, perhaps as additional input data.

In one embodiment of the present invention, the server-side component 28 of the publishing interface 16 determines what tasks are available to the user, formulates a screen based thereon, and forwards such screen to the client-side component 26. As may now be appreciated, such client-side component 18 presents the screen to the user, receives the selection from the user based thereon, and forwards the selection back to the server-side component 28.

Of course, the selected task may allow or require the aforementioned additional input data, and accordingly the server-side component 28 forwards to the client-side component 26 one or more screens to collect such additional data (step 315). Such additional data may be any appropriate data without departing from the spirit and scope of the present invention, and for example may include an identification or name to be assigned to the authored content 10 as stored with the CMS 18, a time period when the authored content 10 is to be available on the web site 20, and other custom data relevant to the authored content 10 and/or the web site 20.

Once all the additional input data has been collected, the server-side component 28 of the publishing interface 16 may then send a summary screen to the client-side component 26 to be displayed to the user (step 317). As may be appreciated, such summary screen may include the collected additional input data and other data, and also may allow the user to modify such data.

Assuming the data is approved by the user, the publishing interface 16 may now proceed to in fact publish the authored content 10 to the CMS 18. Note, though, that prior to such publication, the user may wish to preview the published content 10 so that the user can see how the content 10 appears in published form. Accordingly, to allow the user to preview the published content 10, the server-side component 28 of the publishing interface 16 may send a screen to the client-side component 26 to be displayed to the user, where the sent screen gives the user the option to publish the content 10 or to preview the published content 10 (step 319). As may be appreciated, in either case the result is essentially the same, except that for a preview all actions and resulting objects are temporary in nature. Accordingly, only actual publication need be set forth in detail.

In particular, to actually publish the authored content 10, the client-side component 26 works with the server-side component 28 and the application 14 to convert the content 10 into a pre-determined format as determined by the selected task as was determined at step 313 and also resolves all linked objects 30 (FIG. 2) within the authored content 10. As was set forth above, the format is typically an HTML format, an XML format, a binary content object format, or the like, although any appropriate format may be employed without departing from the spirit and scope of the present invention.

In one embodiment of the present invention, conversion occurs by first resolving each linked object 30 within the main body of the authored content 10 (step 321), and then actually converting the main body of the authored content 10 itself into the pre-determined format (step 323). Such linked objects 30 may be any types of objects without departing from the spirit and scope of the present invention, and may for example include linked pictures, linked text, linked sound files, links to external elements such as web sites, and the like.

To resolve each linked object 30, and with the understanding that the linked object 30 is represented within the authored content 10 as a local pointer to a location of the linked object 30 that is local to the work station 12, the client-side component 26 transmits the linked object 30 to the server-side component 28 (step 321*a*), perhaps after performing any necessary conversions on such linked object. Thereafter, the server-side component 28 stores the linked object 30 in the content database 22 of the CMS 18 (step 321*b*), obtains a database pointer for the location of the linked object within the content database 22 (step 321*c*), and returns the database pointer to the client-side component 26 (step 321*d*). As may be appreciated, such database pointer is likely a URL or the like such that the linked object 30 within the content database 22 may be universally accessed therefrom by way of the URL. As may also be appreciated, such database pointer will be employed when the main body of the authored content 10 is actually converted as at step 323 to replace the local pointer therein. Thus, the authored content 10 as served at the web site 20 includes the database pointer and not the local pointer and resolves the corresponding linked object 30 correctly.

Once all linked objects 30 are resolved, then, such linked objects 30 are stored in the content database 22 and the client-side component 26 has database pointers therefore. The client-side component 26 can then in fact convert the main body of the authored content 10 into the pre-determined format (step 323*a*) and in doing so replace all local pointers for linked objects 30 with corresponding database pointers (step 323*b*). Thereafter, the client-side component 26 transmits the converted content 10 with the replaced pointers to the server-side component 28 (step 323*c*), and such server-side component 28 stores the converted content 10 in the content database 22 of the CMS 18 as the published content 10 (step 323*d*).

Once the content 10 has been published to the CMS 18, the publishing interface 16 is essentially done, and accordingly at least the client-side component 26 at the work station 12 of the user may close or be closed. Of course, after publishing the content 10, the server-side component 28 may perform any post-publishing activities necessary or desired at the CMS 18 (step 325). For example, such server-side component 28 could notify a particular individual or entity that the content 10 has been published and is awaiting review.

While the present invention has thus far been described in terms of publishing content 10 to the CMS 18, it is to be appreciated that such invention can also be employed to publish updated content 10 or to modify data relevant to published content 10. To publish updated content 10, rather than selecting a task as at step 313, the user may employ the publishing interface 16 to select already-published content 10 to be updated. The publishing interface 16 then proceeds as before except that the selected already-published content 10 is replaced with newly published content 10. To modify data relevant to published content 10, the user again employs the publishing interface 16 to select already-published content 10 but such content is not updated. Instead, only the relevant data is modified. Of course, content 10 may be updated and relevant data thereof may be modified at the same time.

CONCLUSION

The publishing interface 16 allows a content author to publish directly to a web site 20 from an application 14 that such content author is familiar with. As the client-side component 26 of the publishing interface 16 may be a wizard-based add-in to the application 14, the publishing interface 16 provides an enhanced and streamlined publishing experience as compared with the prior art.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful publishing interface 16 between a content-authoring application 14 and a content management server 18 such that a content author can author content 10 to be published to the content management server 18 on the content-authoring application 14 and then publish the authored content 18 to the content management server 18. Significantly, the publishing interface 16 does not require the content author to be in network connectivity with the content management server 18 while authoring the content 10. It should be appreciated that changes could be made to the embodiments described above without departing from the inventive concepts thereof. For example, functionality performed by the client-side component 26 of the publishing interface 16 could be performed by the server-side component 28 and vice-versa without departing from the spirit and scope of the present invention. It should be understood, therefore, that this invention is not limited to the particular embodiments disclosed, but it is intended to cover modifications within the spirit and scope of the present invention as defined by the appended claims.

The invention claimed is:

1. A computer-implemented method for a user to publish content to a content management server (CMS) by way of a publishing interface, the CMS for effectuating a web site including the published content, the publishing interface comprising a client-side component working with a content authoring application executing on a work station and a server-side component working with the CMS, the authoring application adapted to allow the user to create content for publishing to the CMS, the method comprising:

the client-side component establishing a communicative connection with the server-side component;

the server side component receiving information identifying a user, determining tasks available to the user, receiving a selection of a task available to the user, determining based on the task selection what additional input is needed, and receiving additional input from the user, the additional input data specifying a time period when the content is to be available for presentation on the web site;

the client-side component accessing the content, the content being authored on a work station by way of the authoring application operating thereon and including a main body and at least one linked object stored locally on the work station, each linked object being linked by the authoring application to the main body by a local pointer therein;

the client-side component transmitting each of the at least one linked object to the server-side component;

the server-side component storing the at least one linked object in a content database of the CMS, obtaining for each of the at least one linked object a database pointer for a location of the respective linked object within the content database, and returning the respective database pointers to the client-side component;

the client-side component converting the main body of the authored content into a pre-determined format and replacing each local pointer for a linked object with the corresponding database pointer;

the client-side component transmitting the converted content with database pointers to the server-side component; and the server-side component storing the converted content in the content database of the CMS as the published content.

2. The method of claim 1 further comprising: the server side component formulating a task screen based on tasks determined to be available to the user, and forwarding such task screen to the client-side component; and the client-side component presenting the task screen to the user, and forwarding the task selection to the server-side component.

3. The method of claim 2 further comprising: the server side component formulating a data screen based on additional input data determined to be required from the user, and forwarding such data screen to the client-side component;

the client-side component presenting the data screen to the user, receiving the additional input data from the user based on the presented data screen.

4. The method of claim 3 further comprising the server-side component sending a summary screen to the client-side component to be displayed to the user, the summary screen summarizing the additional input data received by such server-side component.

5. The method of claim 1 wherein the CMS includes a content database and the server-side component stores the converted main body and the linked objects in the content database of the CMS.

6. The method of claim 1 comprising the client-side component converting the content into a pre-determined format selected from a group consisting of an HTML format, an XML format, and a binary content object format.

7. The method of claim 1 wherein the content is authored on a work station by way of the authoring application prior to invoking the publishing interface.

8. A computer-implemented method for a user to publish content to a content management server (CMS), the CMS for effectuating a web site including the published content, the method comprising:

establishing a communicative connection between a work station and the CMS; identifying a user; determining what tasks are available to the user;

receiving a selection of an available task from the user at the work station;

determining based on the task selection what additional input data is required the user;

receiving the additional input data from the user at the work station, the additional input data specifying a time period when the content is to be available for presentation on a Web site;

accessing the content, the content being authored on the work station by way of an authoring application operating thereon and including a main body and at least one linked object stored locally on the work station, each linked object being linked by the authoring application to the main body by a local pointer therein;

for each linked object in the main body, transmitting the linked object from the work station to the CMS, storing the linked object in a content database of the CMS, and obtaining a database pointer for a location of the linked object within the content database;

converting the main body of the authored content into the determined format and replacing each local pointed for a linked object with the corresponding database pointer; transmitting the converted with each replaced pointer from the work station to the CMS; and storing the converted content in the content database of the CMS as the published content.

9. The method of claim 8 further comprising sending a summary screen to the user at the work station, the summary screen summarizing the additional input data received.

10. The method of claim 8 wherein the CMS includes a content database, the method comprising storing the converted main body and the linked objects in the content database of the CMS.

11. The method of claim 8 comprising converting the content into a pre-determined format selected from a group consisting of an HTML format, an XML format, and a binary content object format.

12. The method of claim 8, the method comprising:

authoring the content on the work station by way of the authoring application prior to invoking the publishing interface; and invoking the publishing interface to publish the content to the CMS.

13. A system for providing a publishing interface for a user to publish content to a content management server (CMS), the CMS for effectuating a web site including the published content, the system for providing a publishing interface comprising:

a client-side computing system working with an authoring application executing; and a server-side computing system working with the CMS, the client-side computing system establishing a communicative connection with the server-side computing system;

the server side computing system receiving information identifying a user, determining tasks available to the user, receiving a selection of a task available to the user, determining based on the task selection what additional input is needed, and receiving additional input, the additional input data specifying a time period when the content is to be available for presentation on the web site;

the client-side computing system accessing the content, the content being authored on a work station by way of the authoring application operating thereon and including a main body and at least one linked object stored locally on the work station, each linked object being linked by the authoring application to the main body by a local pointer therein;

wherein, for each linked object, the client-side computing system transmitting the linked object to the server-side computing system and the server-side computing system storing the linked object in the content database of the CMS, obtaining a database pointer for the location of the linked object within the content database, and returning the database pointer to the client-side computing system;

the client-side computing system converting the main body of the authored content into the pre-determined format and replacing all local pointers for linked objects with corresponding database pointers;

the client-side computing system transmitting the converted content with the replaced pointers to the server-side computing system; and the server-side computing system storing the converted content in the content database of the CMS as the published content.

14. The system of claim 13 wherein: the server side computing system formulates a task screen based tasks determined to be available to the user, and forwards such task screen to the client-side computing system; and the client-side computing system presents the task screen to the user.

15. The system of claim 14 wherein: the server side computing system formulates a data screen based on additional input data determined to be required from the user, and forwards such data screen to the client-side computing system; and the client-side computing system presents the data screen to the user, and receives the additional input data from the user based on the presented data screen.

16. The system of claim 15 wherein the server-side computing system sends a summary screen to the client-side computing system to be displayed to the user, the summary screen summarizing the additional input data received by such server-side computing system.

17. The system of claim 13 wherein the CMS includes a content database and the server-side computing system stores the converted main body and the linked objects in the content database of the CMS.

18. The system of claim 13 wherein the client-side computing system converts the content into a pre-determined format selected from a group consisting of an HTML format, an XML format, and a binary content object format.

19. The system of claim 13 wherein the content is authored on the work station by way of the authoring application prior to invoking the publishing interface.

* * * * *